US008584167B2

(12) United States Patent
VanDuyn

(10) Patent No.: US 8,584,167 B2
(45) Date of Patent: Nov. 12, 2013

(54) ELECTRONIC PROGRAMMING GUIDES COMBINING STORED CONTENT INFORMATION AND CONTENT PROVIDER SCHEDULE INFORMATION

(75) Inventor: Luke VanDuyn, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 134 days.

(21) Appl. No.: 13/149,852

(22) Filed: May 31, 2011

(65) Prior Publication Data
US 2012/0311634 A1  Dec. 6, 2012

(51) Int. Cl.
*H04N 5/445* (2011.01)
(52) U.S. Cl.
USPC .......... 725/45; 725/39; 725/40; 725/41; 725/42; 725/43; 725/44; 725/46; 725/47
(58) Field of Classification Search
USPC ............................. 725/39–47; 25/39–47
See application file for complete search history.

(56) References Cited

U.S. PATENT DOCUMENTS

| 4,706,121 A | 11/1987 | Young |
| 5,335,277 A | 8/1994 | Harvey et al. |
| 5,684,969 A | 11/1997 | Ishida |
| 5,805,763 A * | 9/1998 | Lawler et al. ............... 386/296 |
| 6,701,528 B1 | 3/2004 | Arsenault et al. |
| 6,766,523 B2 | 7/2004 | Herley |
| 7,024,676 B1 | 4/2006 | Klopfenstein |
| 7,487,529 B1 | 2/2009 | Orlick |
| 7,490,169 B1 | 2/2009 | Ogdon et al. |
| 7,493,312 B2 | 2/2009 | Liu et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,804,861 B2 | 9/2010 | Kim |
| 7,962,937 B2 | 6/2011 | Cho et al. |

(Continued)

FOREIGN PATENT DOCUMENTS

WO  2011/027236 A1  3/2011

OTHER PUBLICATIONS

Author Unknown, "Move Networks is Delivering the Next Generation of Television," Move Networks, 2010, obtained online at http://www.movenetworks.com/, 2 pages.

(Continued)

*Primary Examiner* — Dominic D Saltarelli
(74) *Attorney, Agent, or Firm* — Kilpatrick Townsend & Stockton LLP

(57) ABSTRACT

A receiver provides an EPG. The EPG includes schedule information for content accessible by the receiver from a content provider presented as slots in a grid arranged by time and source. The receiver may determine recorded content is stored and incorporate content information for the recorded content in the EPG. The content information may include one or more portions of the instance of recorded content. The receiver may automatically incorporate the content information or may incorporate such information in response to user input. The receiver may incorporate additional information and/or access recorded content in response to user selection of content information. In some implementations, the recorded content may be recorded as part of an automatic system for recording multiple instances of content received via a multi-frequency signal from a content provider wherein the instances of content are all included in a same frequency and encoded utilizing the same control word.

19 Claims, 9 Drawing Sheets

(56) References Cited

U.S. PATENT DOCUMENTS

| | | |
|---|---|---|
| 2001/0033736 A1 | 10/2001 | Yap et al. |
| 2002/0097340 A1 | 7/2002 | Takagi et al. |
| 2002/0152299 A1 | 10/2002 | Traversat et al. |
| 2002/0188943 A1 | 12/2002 | Freeman et al. |
| 2003/0110514 A1 | 6/2003 | West et al. |
| 2003/0200548 A1 | 10/2003 | Baran et al. |
| 2004/0015999 A1 | 1/2004 | Carlucci et al. |
| 2004/0162871 A1 | 8/2004 | Pabla et al. |
| 2005/0229213 A1 | 10/2005 | Ellis et al. |
| 2005/0271365 A1 | 12/2005 | Hisatomi |
| 2006/0206819 A1 | 9/2006 | Tsuji et al. |
| 2006/0215993 A1 | 9/2006 | Yamada |
| 2007/0039032 A1 | 2/2007 | Goldey et al. |
| 2007/0157253 A1 | 7/2007 | Ellis et al. |
| 2007/0165855 A1 | 7/2007 | Inui |
| 2007/0204288 A1 | 8/2007 | Candelore |
| 2008/0046929 A1 | 2/2008 | Cho et al. |
| 2008/0092164 A1 | 4/2008 | Agarwal et al. |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0271077 A1 | 10/2008 | Kim et al. |
| 2008/0291206 A1 | 11/2008 | Uchimura et al. |
| 2009/0165057 A1 | 6/2009 | Miller et al. |
| 2009/0178098 A1 | 7/2009 | Westbrook et al. |
| 2009/0260038 A1 | 10/2009 | Acton et al. |
| 2010/0020794 A1 | 1/2010 | Cholas et al. |
| 2010/0158479 A1 | 6/2010 | Craner |
| 2010/0158480 A1 | 6/2010 | Jung et al. |
| 2010/0313222 A1 | 12/2010 | Lee et al. |
| 2011/0043652 A1 | 2/2011 | King et al. |
| 2011/0078750 A1 | 3/2011 | Tam et al. |
| 2012/0278837 A1 | 11/2012 | Curtis et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |

OTHER PUBLICATIONS

International Search Report and Written Opinion of PCT/US2012/51992 mailed Nov. 2, 2012, 15 pages.

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Search Report and Written Opinion of PCT/US2012/51964 mailed Nov. 2, 2012, 13 pages.

International Search Report and Written Opinion of PCT/US2012/052011 mailed Dec. 17, 2012, 44 pages.

Jung, J., et al., "Design and Implementation of a Multi-Stream CableCARD with a High-Speed DVB-Common Descrambler," ACM Multimedia, 2006, 4 pages.

U.S. Appl. No. 13/286,157, filed Oct. 31, 2011, Non-Final Office Action mailed Jan. 17, 2013, 20 pages.

U.S. Appl. No. 13/215,702, filed Aug. 23, 2011, Notice of Allowance mailed Feb. 11, 2013, 13 pages.

U.S. Appl. No. 13/324,831, filed Dec. 13, 2011 Non-Final Office Action mailed Feb. 28, 2013, 23 pages.

U.S. Appl. No. 13/292,047, filed Nov. 8, 2011 Non-Final Office Action mailed Jan. 18, 2013, 17 pages.

U.S. Appl. No. 13/614,899, filed Sep. 13, 2012 Non-Final Office Action mailed Feb. 5, 2013, 17 pages.

U.S. Appl. No. 13/291,014, filed Nov. 7, 2011 Non-Final Office Action mailed Mar. 29, 2013, 21 pages.

U.S. Appl. No. 13/215,916, filed Aug. 23, 2011 Notice of Allowance mailed Jan. 4, 2013, 10 pages.

* cited by examiner

PROGRAM GUIDE

GROUP LINE
EPISODE 43
PG-13, TV-PG - SERIES/SPECIAL. TWO DETECTIVES ARE ON THE HUNT FOR A KIDNAPPER. THEY USE THEIR SKILLS AND EXPERIENCE TO HELP WITH THEIR SEARCH...(CC)

THURSDAY, 3/3
7:11PM — 402a

MY HD CHANNELS ▼

| THURSDAY, 3/3 | 7:00 PM | 7:30 PM | 8:00 PM | 8:30 PM | 9:00 PM | 9:30 PM |
|---|---|---|---|---|---|---|
| 031-00 | MECHANICS 101 | | DESIGNING THE INTERIORS | | NEWS HOUR | |
| 020-00 | TRACING PEOPLE | | TRACING PEOPLE | OUTDOOR ADVENTURES | NEWS FIRST | TONIGHT'S NEWS |
| 009-00 | DORMS | COUPLES | THE STORAGE | | HISTORY OF ROCKS | HISTORY OF ROCKS |
| 007-00 | STRIKEOUT | | THE DOCTORS EMERGENCY | | THE INSECT SHOW | |
| 006-00 | WEEKLY | THINK TANK | GROUP LINE | 30 MIN NEWS | THE STATES HISTORY SHOW | |
| 004-00 | THEORY | RULES | THE POLICE | | THE BRAINIAC | |
| 002-00 | NEWS SHOW | | SECRETS FROM THE 'OTHERS' | | THE PARTY TOWN | |

THE DOCTORS EMERGENCY
WATCH PREVIOUSLY RECORDED EPISODES OF "THE DOCTORS EMERGENCY." YOU CURRENTLY HAVE 2 PAST EVENTS AVAILABLE FOR IMMEDIATE VIEWING...(CC)

THURSDAY, 3/3
7:11PM

| PROGRAM GUIDE THURSDAY, 3/3 | 7:00 PM | 7:30 PM | 8:00 PM | 8:30 PM | 9:00 PM | 9:30 PM |
|---|---|---|---|---|---|---|
| | | | | | [MY HD CHANNELS ▼] | |
| 031-00 | MECHANICS 101 | | DESIGNING THE INTERIORS | | NEWS HOUR | |
| 020-00 | TRACING PEOPLE | | TRACING PEOPLE | | NEWS FIRST | TONIGHT'S NEWS |
| 009-00 | DORMS | COUPLES | THE STORAGE | OUTDOOR ADVENTURES | HISTORY OF ROCKS | HISTORY OF ROCKS |
| 007-00 | STRIKEOUT | | THE DOCTORS EMERGENCY | | THE INSECT SHOW | |
| 006-00 | WEEKLY | THINK TANK | THE DOCTORS EMERGENCY — STORED CONTENT! 2 PAST EVENTS AVAILABLE TO WATCH NOW! | | THE STATES HISTORY SHOW | |
| 004-00 | THEORY | RULES | | | THE BRAINIAC | |
| 002-00 | NEWS SHOW | | SECRETS FROM THE 'OTHERS' | | THE PARTY TOWN | |

STRIKEOUT
EPISODE 43
PG-13, TV-PG - SERIES/SPECIAL. REALITY SHOW WHERE CONTESTANTS FIGHT IT OUT TO SEE WHO WINS THE ULTIMATE PRIZE...(CC)

THURSDAY, 3/3
7:11PM

PROGRAM GUIDE | MY HD CHANNELS ▼

| THURSDAY, 3/3 | 7:00 PM | 7:30 PM | 8:00 PM | 8:30 PM | 9:00 PM | 9:30 PM |
|---|---|---|---|---|---|---|
| 031-00 | MECHANICS 101 | | DESIGNING THE INTERIORS | | NEWS HOUR | |
| 020-00 | TRACING PEOPLE | | TRACING PEOPLE | OUTDOOR ADVENTURES | NEWS FIRST | TONIGHT'S NEWS |
| 009-00 DORMS | COUPLES | THE STORAGE | | HISTORY OF ROCKS | HISTORY OF ROCKS | |
| 007-00 | STRIKEOUT | DREAM DANCING | THE DOCTORS EMERGENCY | THE DOCTORS EMERGENCY | THE INSECT SHOW | |
| CONTENT STORED | REALITY DATING | | NOT PERFECT | | THE HOUSEBANDS | THE TRUTH OR LIES |
| 002-00 | NEWS SHOW | | SECRETS FROM THE 'OTHERS' | | THE PARTY TOWN | |

FIG. 5A

NOT PERFECT

WATCH PREVIOUSLY RECORDED EPISODES OF "NOT PERFECT." YOU CURRENTLY HAVE 2 PAST EVENTS AVAILABLE FOR IMMEDIATE VIEWING.

THURSDAY, 3/3 7:11PM

PROGRAM GUIDE — [MY HD CHANNELS ▼]

| THURSDAY, 3/3 | 7:00 PM | 7:30 PM | 8:00 PM | 8:30 PM | 9:00 PM | 9:30 PM |
|---|---|---|---|---|---|---|
| 031-00 | MECHANICS 101 | | DESIGNING THE INTERIORS | | NEWS HOUR | |
| 020-00 | TRACING PEOPLE | COUPLES | TRACING PEOPLE | | NEWS FIRST | TONIGHT'S NEWS |
| 009-00 | DORMS | | THE STORAGE | OUTDOOR ADVENTURES | HISTORY OF ROCKS | HISTORY OF ROCKS |
| 007-00 | STRIKEOUT | DREAM DANCING | THE DOCTORS EMERGENCY | THE DOCTORS EMERGENCY | THE INSECT SHOW | |
| CONTENT STORED | REALITY DATING | | NOT PERFECT | | THE HOUSEBANDS | THE TRUTH OR LIES |
| 002-00 | NEWS SHOW | | SECRETS FROM THE 'OTHERS' | | THE PARTY TOWN | |

FIG.5C

ELECTRONIC PROGRAMMING GUIDES COMBINING STORED CONTENT INFORMATION AND CONTENT PROVIDER SCHEDULE INFORMATION

FIELD OF THE INVENTION

This disclosure relates generally to content receivers, and more specifically to electronic programming guides that present information regarding content stored on a content receiver as well as schedule information regarding content available via the content receiver from one or more content providers.

SUMMARY

The present disclosure discloses systems and methods for providing electronic programming guides that combine stored content information with content provider schedule information. A content receiver may provide an EPG (electronic programming guide) to one or more presentation devices. The EPG may include schedule information for one or more instances of content accessible by the content receiver from one or more programming providers that are presented as slots in a grid arranged by time and source associated with the respective instance of content. When the content receiver provides the EPG, the content receiver may determine whether or not recorded content is stored on the content receiver. If so, the content receiver may incorporate content information for one or more of the instances of recorded content in the EPG and transmit an updated EPG to the presentation device.

The content information may include one or more portions of the instance of recorded content, such as one or more images and/or one or more video segments obtained by processing the recorded content, and/or may include images or video segments related to the instance of recorded content received from a content provider.

In various implementations, the content receiver may automatically incorporate the content information for the recorded content in the EPG. However, in various other implementations, the content receiver may incorporate the content information when a slot in the EPG grid corresponding to content associated with recorded content is selected by a user. Further, in various implementations, in response to a user selection of the content information, the content receiver may be configured to incorporate additional information into the EPG and/or access the instances of recorded content that are associated with the content information.

In some implementations, the recorded content stored by the content receiver may be recorded as part of an automatic system for recording multiple instances of content (such as the television programs corresponding to the four major channels that are broadcast in the period of time between 7 PM and 10 PM mountain time) received via one or more multi-frequency signals from one or more content providers. The instances of content may be all included in a same frequency of the multi-frequency signal and may all be encoded utilizing a same control word. When the content receiver receives the multi-frequency signal from the content provider, the content receiver may decode the instances of content included in the same frequency of the multi-frequency signal utilizing the same control word (which may be derived from the same entitlement control message) and store the instances of content in a non-transitory storage medium. The content receiver may receive and decode the multiple instances of content in response to receiving one or more recordation instructions from the content provider. In such implementations, the content receiver may incorporate content information for any and/or all of the multiple instances of content into the EPG.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4A-4C are diagrams illustrating a first example EPG which may be provided by the system of FIG. 1.

FIGS. 5A-5C are diagrams illustrating a second example EPG which may be provided by the system of FIG. 1.

DETAILED DESCRIPTION OF THE EMBODIMENTS

Figure 1:
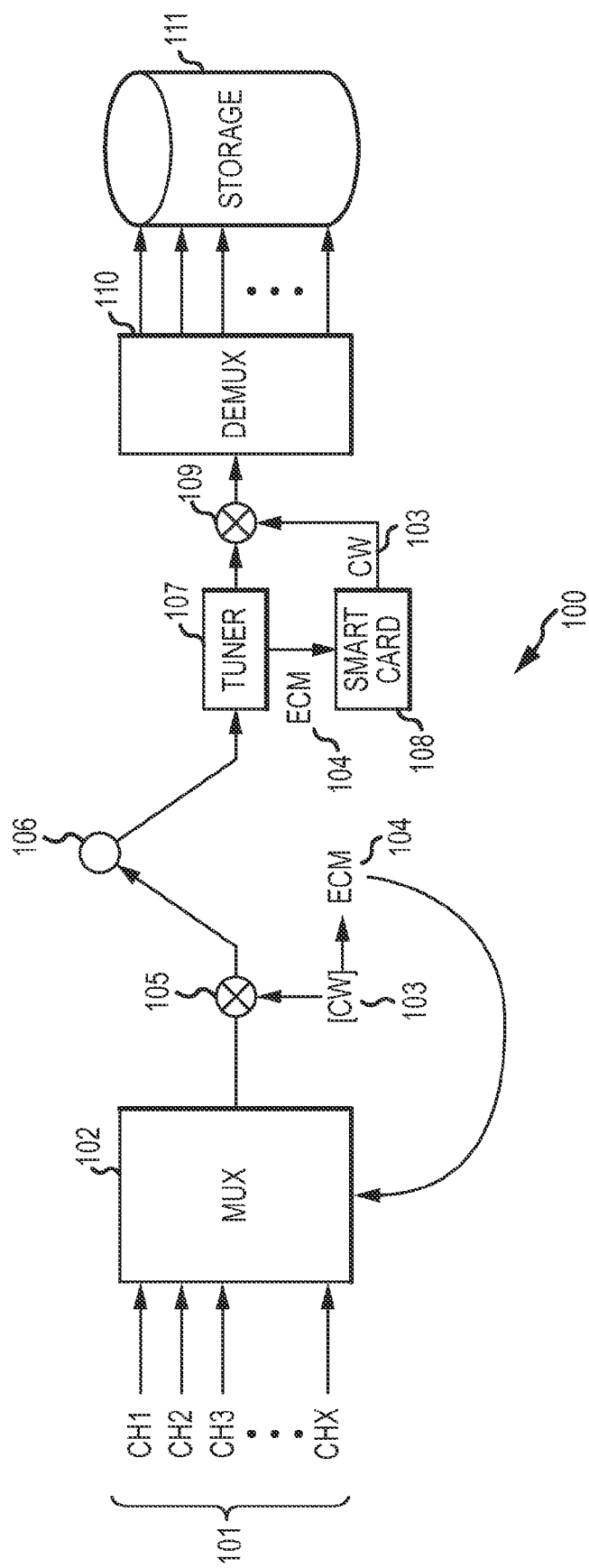
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, and so on) generally receive content from one or more programming providers (such as satellite television programming providers, cable television programming providers, Internet service providers, video on demand providers, pay-per-view movie providers, and so on) via one of more communication connections (such as satellite communication connections, coaxial cable communication connections, Internet communication connections, radio-frequency connections, and so on). Such content receivers may transmit such received content to one or more presentation devices and/or store the received content for later presentation.

In order to enable users to better comprehend and select among content that is available, content receivers may provide one or more EPGs (electronic programming guide) that detail content available from content providers and the schedule of such content. Such EPGs may be provided based at least one information provided by the content providers regarding available content and/or content schedules. Content receiver may also provide one or more menus that detail content stored on the content receiver. By utilizing such EPGs and/or menus, users may be able to discover content that is available and access such content.

However, content receivers typically present such EPGs and stored content menus separately. As such, users cannot browse among content currently available from content providers at the same time that they browse stored content. In order to browse currently available content as well as stored content, users may have to switch repeatedly between an EPG and a stored content menu, possibly confusing users and rendering the process of selecting content burdensome. Further, as users may have to switch between and EPG and a stored content menu, the users may not be presented with any information regarding relationships between currently available content and stored content. As a result, users may not fully utilize the full scope of features provided by content receivers.

The present disclosure discloses systems and methods for providing electronic programming guides that combine stored content information with content provider schedule information. A content receiver may provide an EPG that includes schedule information for one or more instances of content accessible by the content receiver from one or more programming providers. The content receiver may provide the schedule information for the instance of content as a slot in a grid arranged by time associated with the instance of content and source associated with the instance of content. When the content receiver determines to provide the EPG, the content receiver may determine whether or not one or more instances of recorded content are stored on the content receiver. If so, the content receiver may incorporate content information for one or more of the instances of recorded content in the EPG. The content information may include one or more portions of the instance of recorded content, such as one or more images and/or one or more video segments. Further, a user may be able to access the instances of recorded content by selecting the content information from the EPG. In this way, users may be able to better access currently available received content and/or stored content via the content receiver.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more multi-frequency signals utilizing one or more satellites. Each frequency (sometimes referred to as a band or transponder) of the multi-frequency signal may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequencies of the received multi-frequency signal that contains data for a particular programming channel utilizing one or more tuners. The tuner may then process the tuned frequency by utilizing the data received via the tuned frequency associated with the particular programming channel and discarding data received via the tuned frequency associated with other programming channels. The content receiver may decrypt the ECM included with the data associated with the particular programming channel to obtain the CW, descramble the data utilizing the CW, and store and/or transmit the data to one or more presentation devices.

As illustrated in FIG. 1, in this implementation, one or more content providers may select multiple instances of content 101 to be automatically recorded. For example, a content provider may select all of the television events defined as "primetime events" associated with all channels defined as "primetime television channels" for a particular period of time defined as "prime time" to be automatically recorded. In other examples, the content provider may select television events associated with channels for a particular time period (such as a half hour, multiple hours, and/or an entire programming day) in response to user selections. After the content provider selects the multiple instances of content, the multiple instances of content may be multiplexed utilizing one or more multiplexers 102. The multiplexed signal (which includes the multiplexed selected multiple instances of content) may then be scrambled by one or more combiners 105 utilizing one or more CWs 103. The CW may be encrypted to generate an ECM, which may be included with the multiplexed signal. The scrambled multiplexed signal may then be included in a multi-frequency signal which may then be transmitted to one or more satellites 106 for broadcast. The satellite 106 may receive and broadcast the multi-frequency signal to a number of content receivers, such as a content receiver that includes a tuner 107.

The tuner 107 may tune to the frequency that includes the multiple instances of content (which may be performed in response to one or more recording instructions received by the content receiver that includes the tuner from the content provider) and obtain the included ECM 104. The ECM may be provided to a smart card 108 which may decrypt the ECM to obtain the CW 103. The data received via the tuned frequency may be descrambled by a combiner 109 utilizing the CW and then demultiplexed by a demultiplexer 110 before being stored in a non-transitory storage medium 111 (which may take the form of, but is not limited to, a magnetic storage medium; optical storage medium; magneto-optical storage medium; read only memory; random access memory; erasable programmable memory; flash memory; and so on). Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs, and/or without requiring the combiner 109 to have to descramble multiple signals.

Although the system 100 is illustrated in FIG. 1 and described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the code word prior to multiplexing. In another example, in some implementations, the data received via the tuned frequency may be demultiplexed before being individually descrambled utilizing the code word.

Figure 2:
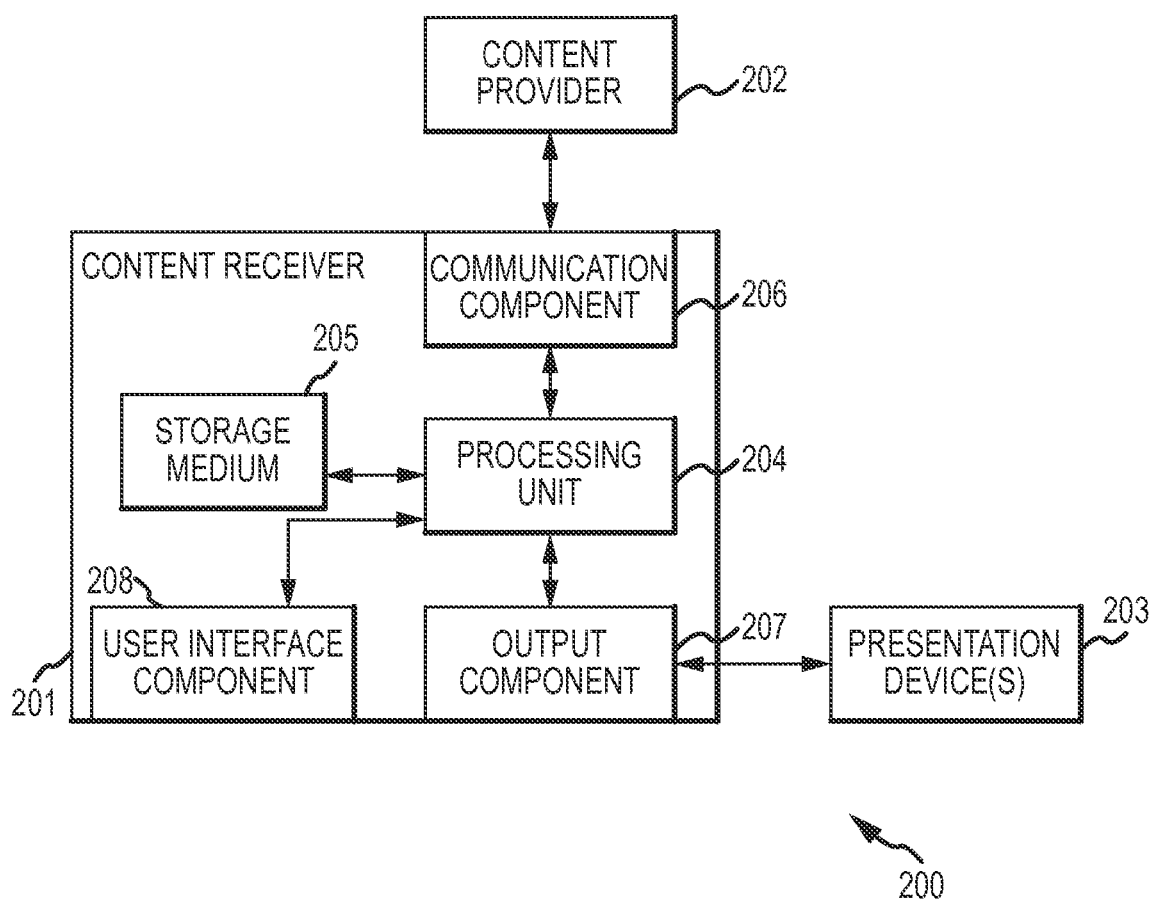
FIG. 2 is a block diagram illustrating a system for providing electronic programming guides that combine stored content information with content provider schedule information.

FIG. 2 is a block diagram illustrating a system 200 for providing electronic programming guides that combine stored content information with content provider schedule information. The system 200 includes a content receiver 201 which may be a set top box, a television receiver, a digital video recorder, a digital music player, a desktop computer, a laptop computer, a tablet computer, a mobile computer, a cellular telephone, a smart phone, and/or any other electronic device that is able to receive and/or provide received content. The system 200 may also include one or more content providers 202 (such as one or more satellite television programming providers, cable television programming providers, Internet service providers, video on demand providers, pay-per-view movie providers, and/or other entities that are configured to transmit instances of content to the content receiver) and/or one or more presentation devices 203 (such as one or more cathode ray tube displays, computer monitors, liquid crystal displays, televisions, speakers, and/or other devices configured to present instances of content transmitted by the content receiver).

The content receiver 201 may include one or more processing units 204 (which may perform functions and/or include components [not shown] that perform functions corresponding to the smart card 108, the combiner 109, and/or the demultiplexer 110 of FIG. 1), one or more non-transitory storage media 205, one or more communication components 206 (which may include, but is not limited to, the tuner 107 of FIG. 1), one or more output components 207, and one or more user interface components 208.

The processing unit 204 may execute instructions stored in the non-transitory storage medium 205 to receive one or more instances of content, instructions to record such instances of content, and/or EPG data from the content provider 202 via one or more communication links (such as one or more satellite communication connections, coaxial cable communication connections, Internet communication connections, radio-frequency connections, and/or other communication links) utilizing the communication component and/or store such content in the non-transitory storage medium (which may be at the direction of one or more instructions received from the content provider that specify to record received instances of content).

The processing unit 204 may also execute instructions stored in the non-transitory storage medium 205 to transmit instances of content received from the content provider 202 and/or stored in the non-transitory storage medium to the presentation device 203 utilizing the output component. In one or more cases, the processing unit may execute the instructions described above in response to one or more user instructions received from one or more user input/output devices (not shown) (such as one or more remote control devices, touch screens, buttons, keyboards, mice, and/or other input/output devices) via the user interface component 208.

Additionally, the processing unit 204 may execute instructions stored in the non-transitory storage medium 205 to transmit one or more EPGs to the presentation device 203 via the output component 207 (which may be performed in response to one or more user instructions received via the user interface component 208). The EPG may include schedule information for one or more instances of content accessible by the content receiver 201 from the content provider 202. The schedule information for the instances of content may be configured in the EPG as slots in a grid arranged by time associated with the respective instance of content and source (such as channel) associated with the respective instance of content. In some cases, the EPG may include one or more additional information fields that may present additional information regarding an instance of content (such as a program description and other program information for a television program) when user selection of a slot corresponding the instance of content is received via the user interface component 208.

The processing unit 204 may determine whether or not one or more instances of recorded content are stored in the non-transitory storage medium 205. If so, the processing may incorporate content information for one or more of the instances of recorded content in the EPG. The content information that the processing unit incorporates in the EPG may include, but is not limited to, one or more portions of the instance of recorded content such as one or more images and/or one or more video segments and/or one or more images and/or video segments related to the instance of recorded content. The processing unit may obtain the portion of the instance of content and/or the image or video segment related to the instance of recorded content (such where the instance of content is an episode of a television series and the processing unit obtains an image from a future episode) to include in the content information by processing the instance of content stored in the non-transitory storage medium and/or by receiving images and/or video segments from the content provider.

In some implementations, the processing unit 204 may be configured to always include content information for one or more instances of recorded content when such instances of recorded content are stored in the non-transitory storage medium 205. For example, the processing unit may include a field in the EPG that includes content information for each of the instances of recorded content stored in the non-transitory storage medium. In other implementations, the processing unit may provide an EPG that does not include such content information and may incorporate the content information after receiving a user selection of one of more slots of the EPG via the user interface component 208. The content information incorporated in response to the user selection of the slot may correspond to one or more recorded instances of content stored in the non-transitory storage medium that are associated with the instance of content that corresponds to the slot.

Regardless whether the processing unit 204 incorporates the content information prior to user input or in response to user input, the processing unit may be configured to perform one or more actions in response to receiving a user selection of the content information incorporated into the EPG. For example, in some implementations the processing unit may incorporate additional information related to the instance of recorded content corresponding to the selected content information into the EPG. Such additional information may include, but is not limited to, descriptions of the instance of content, ratings of the instance of content, information about the number of related instances of content are stored on the non-transitory storage medium 205 (such as where the instance of content is an episode of a particular television series and the additional information includes the number of episodes of that particular television series that are stored in the non-transitory storage medium), and/or other such information related to the particular instance of content. By way of another example, in some implementations the processing unit may be configured to access an instance of content that corresponds to the selected content information from the non-transitory storage medium.

In various implementations, the instances of recorded content for which the processing unit 204 incorporates content information in the EPG may be the multiple instances of content 101 selected to be automatically recorded as illustrated in FIG. 1 and described above. The content receiver 201 may have automatically recorded the multiple instances of content 101 in response to receiving instructions to record the multiple instances of content 101 from the content provider 202. When providing the EPG, the processing unit may include content information for each of the multiple instances of content 101. In various other implementations, the instances of recorded content for which the processing unit 204 incorporates content information in the EPG may be instances of content which the processing unit has recorded in response to user input received via the user interface component 208 such as recorded broadcast content, recorded video on demand content, recorded pay-per-view content, and so on.

Figure 3:
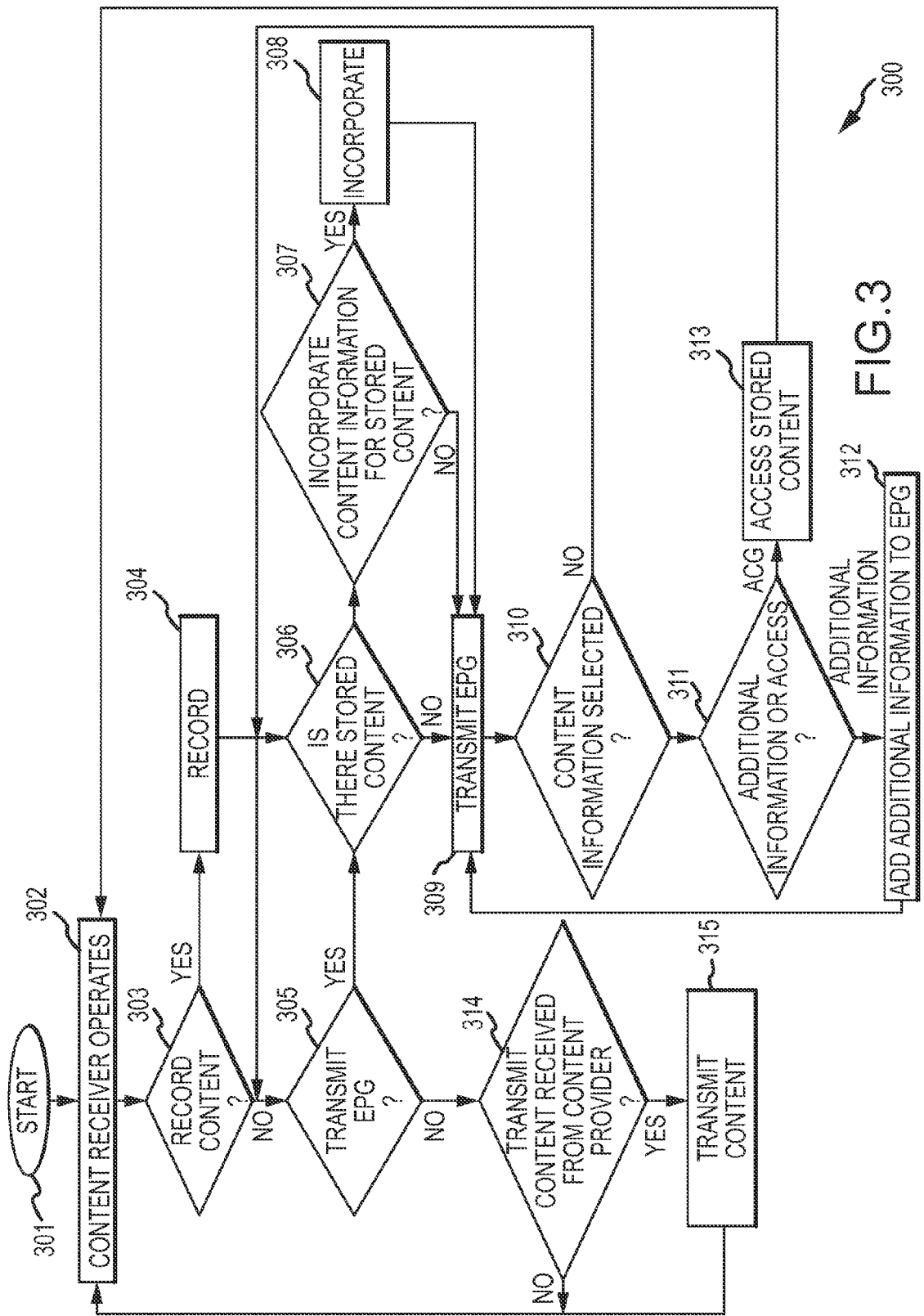
FIG. 3 is a flow chart illustrating a method for providing electronic programming guides that combine stored content information with content provider schedule information. This method may be performed by the system of FIG. 2.

FIG. 3 illustrates a method 300 for providing electronic programming guides that combine stored content information with content provider schedule information. The method 300 may be performed by the content receiver 201 of FIG. 2. The flow begins at block 301 and proceeds to block 302 where the content receiver 201 operates. The flow then proceeds to block 303 where the processing unit 204 determines whether or not to record one or more instances of content received from the programming provider 202. The processing unit may determine to record an instance of content if such has been specified by a user, by an instruction received from the content provider (such as illustrated in FIG. 1 and described above), and/or otherwise specified. If so, the flow proceeds to block 304 where the processing unit records the specified instance of content in the non-transitory storage medium 205 before the flow proceeds to block 305. Otherwise, the flow proceeds directly to block 305.

At block 305, the processing unit 204 determines whether or not to transmit an EPG to the presentation device 203. The processing unit 204 may determine to transmit an EPG to the presentation device in response to a user request for an EPG received via the user interface component 208. If so, the flow proceeds to block 306. Otherwise, the flow proceeds to block 314.

At block 306, after the processing unit 204 determines to transmit an EPG, the processing unit determines whether or not recorded content is stored in the non-transitory storage medium 205. If so, the flow proceeds to block 309 where the processing unit transmits an EPG to the presentation device 203 before the flow proceeds to block 310. Otherwise, the flow proceeds to block 307.

At block 307, after the processing unit 204 determines that recorded content is stored in the non-transitory storage medium 205, the processing unit determines whether or not to incorporate content information for the recorded content in the EPG. The processing unit may determines to incorporate content information for the recorded content in the EPG or not based on one or more EPG configuration settings stored in the non-transitory storage medium. If the processing unit determines to incorporate content information for the recorded content in the EPG, the flow proceeds to block 308 where the processing unit incorporates the content information in the EPG before the flow proceeds to block 309. Otherwise, the flow proceeds directly to block 309.

At block 310, after the processing unit 204 transmits the EPG to the presentation device 203, the processing unit determines whether or not a selection of content information in the EPG is received from a user via the user interface component 208. If not, the flow returns to block 305 where the processing unit determines whether or not to continue transmitting the EPG. Otherwise, the flow proceeds to block 311.

At block 311, after the processing unit 204 that a selection of content information in the EPG is received from a user via the user interface component 208, the processing unit determines whether the selection indicates to provide additional information or to access the instance of recorded content associated with the content information. If the selection indicates to provide additional information, the flow proceeds to block 312 where the processing unit incorporates the additional information before the flow returns to block 309 and the processing unit transmits the EPG. Otherwise, if the selection indicates to access the instance of recorded content, the flow proceeds to block 313 where the processing unit accesses the instance of recorded content before the flow returns to block 302 and the content receiver 202 continues to operate.

At block 314, after the processing unit 204 determines not to transmit an EPG, the processing unit determines whether or not to transmit an instance of content currently being received from the content provider 202 to the presentation device 203. The processing unit may determine to transmit an instance of content currently being received from the content provider to the presentation device in response to user input received via the user interface component 208. If so, the flow proceeds to block 315 where the processing unit transmits an instance of content currently being received from the content provider to the presentation device. Otherwise, the flow returns to block 302 where the content receiver 201 continues to operate.

Although the method 300 is illustrated and described as including a number of particular operations performed in a particular order, it is understood that this is merely for the purposes of example. In various implementations, the disclosure may be performed without particular operations of the method 300 and/or in different orders without departing from the scope of the present disclosure.

Figure 4B:

FIGS. 4A-4C illustrate a first example EPG 400a-400c. The first example EPG may be provided by the system 200 of FIG. 2. In this example, a content receiver may be instructed to automatically record content as illustrated in FIG. 1 and described above. In accordance with FIG. 1 and the associated description above, the content receiver may be instructed to automatically record television programming associated with the major four television networks that is broadcast between the hours of seven PM and ten PM mountain time. The content receiver may also provide the EPG 400a illustrated in FIG. 4A. As illustrated, the EPG includes a grid 401a made up of a number of slots that each correspond to a television program and are arranged by an associated channel and an associated broadcast time. Also as illustrated, the EPG includes a description field 402a where additional information related to a selected slot 403A is displayed.

In FIG. 4A, content information related to recorded television programs stored by the content receiver is not incorporated into the EPG 400a. However, as illustrated in FIG. 4B, if a slot 404b corresponding to a television program that is associated with recorded television programs stored by the content receiver is selected, the content receiver incorporates a pop-up window 405b that includes content information for the associated recorded television programs in the EPG 400b. Also, as the slot 404b is now selected, the description field 402b includes additional information related to slot 404b. As shown, the pop-up window includes an image derived from the associated television program as well as information regarding the number of episodes of that television series that are stored by the content receiver.

Further, as illustrated in FIG. 4C, if the pop-up window 405c is selected, the description field 402c displays the number of episodes of the television series corresponding to the associated television program that are stored by the content receiver.

Figure 5B:

FIGS. 5A-5C illustrate a second example EPG 500a-500c. The second example EPG may be provided by the system 200 of FIG. 2. In this example, a content receiver may be instructed to automatically record content as illustrated in FIG. 1 and described above. In accordance with FIG. 1 and the associated description above, the content receiver may be instructed to automatically record television programming associated with the major four television networks that is broadcast between the hours of seven PM and ten PM mountain time. The content receiver may also provide the EPG 500a illustrated in FIG. 5A. As illustrated, the EPG includes a grid 501a made up of a number of slots that each correspond to a television program and are arranged by an associated channel and an associated broadcast time. Also as illustrated, the EPG includes a description field 502a where additional information related to a selected slot 503A is displayed.

Further, content information related to a number of the recorded television programs stored by the content receiver is incorporated into the EPG 500a in the recorded program bar 504a. As shown, the recorded program bar includes content information for each television series for which one or more episodes are stored by the content receiver. This content information takes the form of an image derived from a stored episode of the respective television series.

As illustrated in FIG. 5B, if the recorded program bar 504b is selected, the description field 502b includes information regarding the programs stored by the content receiver. Additionally, as illustrated in FIG. 5C, if one of the images 505c in the recorded program bar 504c is selected, the description field 502c displays the number of episodes of the television series corresponding to the associated television program that are stored by the content receiver.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing an electronic programming guide that combines stored content information with content provider schedule information, the method comprising:
    recording multiple of instances of content during a single discrete time window received on a frequency of a multi-frequency signal using a tuner of the content receiver, wherein the multiple instances of content are received as a serial broadcast of each of the multiple instances of content and are received during the single discrete time window;
    providing, utilizing the content receiver, the electronic programming guide comprising at least schedule information for at least one instance of content accessible by the content receiver from at least one content provider wherein
    the schedule information for the at least one instance of content is presented as at least one slot in a grid arranged by time associated with the at least one instance of content and source associated with the at least one instance of content;
    determining, utilizing the content receiver, that the multiple instances of recorded content are stored by the content receiver; and
    incorporating, utilizing the content receiver, content information for each instance of the multiple instances of recorded content into the electronic programming guide such that the content information for each instance of the multiple instances of recorded content is presented simultaneously with schedule information in the electronic programming guide.

2. The method of claim 1, wherein the plurality of instances of content are all scrambled utilizing a same control word.

3. The method of claim 2, wherein when the content receiver receives the at least one multi-frequency signal from the at least one content provider the content receiver decodes the plurality of instances of content included in the same frequency of the multi-frequency signal.

4. The method of claim 1, wherein the multiple instances of recorded content comprises at least one of at least one image or at least one video segment.

5. The method of claim 4, wherein the at least one instance of content is associated with the multiple instances of recorded content and said operation of incorporating, utilizing the at least one content receiver, content information for the multiple instances of recorded content into the electronic programming guide further comprises incorporating the content information for the multiple instances of recorded content into the electronic programming guide in response to receiving at least one user selection of the at least one slot in the grid that includes the schedule information for the at least one instance of content.

6. The method of claim 1, wherein the content information includes information regarding at least one associated instance of recorded content stored by the at least one content receiver.

7. The method of claim 1, further comprising presenting additional information for the multiple instances of recorded content stored by the at least one content receiver in response to receiving at least one user selection of the content information.

8. The method of claim 1, further comprising accessing an instance of the multiple instances of recorded content in response to receiving at least one user selection of the content information.

9. The method of claim 1, further comprising transmitting the electronic programming guide to at least one presentation device.

10. A system for providing an electronic programming guide that combines stored content information with content provider schedule information, comprising:
- at least one content receiver, comprising:
  - at least one communication component that receives information for the electronic programming guide from at least one content provider;
  - a tuner, wherein the tuner is configured to receive multiple instances of content as a multiplexed signal on a frequency of a multi-frequency signal, wherein the multiple instances of content are received as a serial broadcast of each of the multiple instances of content and are received during a single discrete time window;
  - a non-transitory storage medium configured to record the multiple instances of content;
  - at least one processing unit that provides the electronic programming guide wherein the electronic programming guide comprises:
    - at least schedule information for at least one instance of content accessible by the at least one content receiver from the least one content provider via the at least one communication component and wherein the schedule information for the at least one instance of content is presented as at least one slot in a grid arranged by time associated with the at least one instance of content and source associated with the at least one instance of content; and
  - at least one output component that transmits the electronic programming guide provided by the at least one processing unit to at least one presentation device;
  - wherein the at least one processing unit determines that the multiple instances of recorded content is stored in the non-transitory storage medium of the content receiver and incorporates content information for each instance of the multiple instances of recorded content into the electronic programming guide such that the content information for each instance of the multiple instances of recorded content is presented simultaneously with schedule information in the electronic programming guide.

11. The system of claim 10, further comprising at least one user interface component wherein the at least one processing unit accesses an instance of the multiple instances of recorded content in response to receiving at least one selection of the content information via the at least one user interface component.

12. The system of claim 10, wherein the at least a portion of the at least one instance of content comprises at least one of at least one image or at least one video segment.

13. The system of claim 12, further comprising at least one user interface component wherein the at least one instance of content is associated with an instance of the multiple instances of recorded content and the at least one processing unit incorporates the content information for the instance of the multiple instances of recorded content into the electronic programming guide in response to receiving at least one user selection via the at least one user interface component of the at least one slot in the grid that includes the schedule information for the at least one instance of content.

14. The system of claim 10, further comprising at least one user interface component wherein the at least one processing unit presents additional information for an instance of the multiple instances of recorded content or at least one associated instance of recorded content stored in at least one non-transitory storage medium in response to receiving at least one user selection of the content information via the at least one user interface component.

15. The system of claim 10, wherein the content information includes information regarding at least one associated instance of recorded content stored in at least one non-transitory storage medium.

16. The system of claim 10, wherein the at least one processing unit stores the multiple instances of recorded content as part of decoding and recording a plurality of instances of content from the multi-frequency signal received from the at least one content provider via the at least one communication component wherein the plurality of instances of content are all scrambled utilizing a same control word.

17. The system of claim 10, wherein the at least one processing unit incorporates content information for each of the stored plurality of instances of content.

18. A content receiver comprising:
- a tuner configured to receive multiple instances of content as a multiplexed signal on a frequency of a multi-frequency signal from at least one content provider wherein:
  - the multiple instances of content are all scrambled utilizing a same control word; and
  - the multiple instances of content are received as a serial broadcast of each of the multiple instances of content and are received during a single discrete time window; and
- a non-transitory storage medium configured to store the multiple instances of content;
- at least one processing unit, communicably coupled to the at least one communication component, that:
  - decodes multiple of instances of content and records the decoded multiple instances of content to the non-transitory storage medium; and
  - provides the electronic programming guide wherein the electronic programming guide comprises:
    - at least schedule information for at least one instance of content accessible by the at least one content receiver from the at least one content provider via the at least one communication component, and
    - wherein the schedule information for the at least one instance of content is presented as at least one slot in a grid arranged by time associated with the at least one instance of content and source associated with the at least one instance of content; and
- at least one output component, communicably coupled to the at least one processing unit, that transmits the electronic programming guide provided by the at least one processing unit to at least one presentation device;

wherein the at least one processing unit determines that the multiple instances of recorded content is stored in the at least one non-transitory storage medium and incorporates content information for each instance of the multiple instances of recorded content into the electronic programming guide such that the content information for the multiple instances of recorded content is presented simultaneously with schedule information in the electronic programming guide.

19. The content receiver of claim 18, wherein the at least one processing unit accesses the at least one instance of recorded content in response to receiving at least one selection of the content information via at least one user interface component.

* * * * *